United States Patent [19]

Seaman et al.

[11] Patent Number: 5,315,707

[45] Date of Patent: May 24, 1994

[54] MULTIPROCESSOR BUFFER SYSTEM

[75] Inventors: Michael J. Seaman, San Jose, Calif.;
Stewart F. Bryant, Redhill, England

[73] Assignee: Digital Equipment Corporation, Maynard, Mass.

[21] Appl. No.: 818,608

[22] Filed: Jan. 10, 1992

[51] Int. Cl.$^5$ .................. G06F 13/00; G06F 12/00
[52] U.S. Cl. ................................. 395/250; 395/200
[58] Field of Search ............... 370/60, 94.1; 395/250, 395/200

[56] References Cited

U.S. PATENT DOCUMENTS

| | | | |
|---|---|---|---|
| 4,414,620 | 11/1983 | Tsuchimoto et al. | 395/200 |
| 4,543,627 | 9/1985 | Schwab | 395/200 |
| 4,744,023 | 5/1988 | Welsch | 364/200 |

Primary Examiner—Robert L. Richardson
Attorney, Agent, or Firm—Kenyon & Kenyon

[57] ABSTRACT

The present invention is directed to a buffer swapping scheme to communicate a message from a first device to a second device wherein a pointer to a free buffer is returned to the first device by the second device as a condition for the first device to pass a pointer to a buffer containing a message intended for the second device.

27 Claims, 5 Drawing Sheets

MULTIPROCESSOR BUFFER SYSTEM

FIELD OF THE INVENTION

The present invention is directed to a multiprocessor computer system and, more particularly, to a scheme for communicating messages between the processors of the multiprocessor computer system.

BACKGROUND OF THE INVENTION

Modern computer systems are often implemented as multiprocessor systems wherein a plurality of processors are coupled to one another by, e.g., a bus. In the operation of the computer system, it is often necessary for the processors to communicate messages to one another. In one known scheme, each message is stored in a buffer by the processor generating the message (the source processor). The source processor then passes a pointer to the buffer to the processor to which the message is directed (the destination processor) and the destination processor utilizes the pointer to read the message from the buffer. As should be understood, each processor can be either a source or destination of messages.

The buffer pointer passing scheme prevents temporary input/output bandwidth crunches at any particular destination processor, as might occur, e.g., if each entire message were directly transmitted to the destination processor and several source processors need to forward messages to the particular destination processor during the same time period. The passing of pointers permits each destination processor to schedule the movement of messages from the appropriate buffers to the respective destination processor. A particular destination processor can readily receive and store pointers and access the associated buffers for the full messages over a time period consistent with the input/output bandwidth of the particular destination processor.

The buffers used to communicate messages can all be arranged in a shared central memory, coupled to the bus. The use of a central memory simplifies the overall design requirements for the buffer system and provides flexibility in the allocation of buffers between processors. At initialization of the system, each source processor is allocated a number of buffers within the central memory consistent with the amount of message traffic expected from that source. In addition, the shared memory can be implemented with an input/output bandwidth at, e.g., twice the peak receive rate for messages so that the central memory can handle the highest possible amount of full message traffic generated throughout the system. In this manner, there are less rigorous bandwidth requirements at each potential destination processor, which, as indicated, need only receive pointers to the buffers storing the full messages and operate to schedule the transfer of the full messages at a rate within the input/output bandwidth of the particular destination processor.

While the known buffer pointer approach to multiprocessor communication provides an advantageous scheme for effectively passing messages between processors, the scheme does not adequately provide for an assured supply of free buffers for each source processor through a reliable return of free buffers by destination processors. This is particularly true in multiprocessor systems with heavy message traffic.

SUMMARY OF THE INVENTION

The present invention provides a message communication scheme that assures an orderly and guaranteed return of free buffers to a source processor as part of the message forwarding protocol. Generally, the present invention comprises a buffer swapping scheme wherein a pointer to a free buffer is returned to a source processor by a destination processor as a condition for the source processor to pass a pointer to a buffer containing a message directed to the destination processor. Thus, the consumer of buffers, the destination processor, is made responsible for maintaining an adequate supply of the buffer resource. According to a feature of the present invention, the buffer swapping scheme is implemented in a manner to avoid the need to synchronize the source and destination processors for the exchange of buffer pointers or the need to synchronize source processors transferring messages to a common destination processor.

To that end, the destination processor maintains a pool of pointers to free buffers and the source processor performs an independent sequence of steps, during the transfer of a pointer to the destination processor, to acquire one of the free buffers before transferring the pointer to the buffer containing the message for the destination processor. Each destination processor is arranged to maintain a set of buffer ring memories, one dedicated to each potential source processor, to link each potential destination to all potential sources of messages. The ring memories for a particular destination processor can be implemented as a local memory at the destination processor. In the alternative, all of the ring memories can be implemented in a centralized memory resource accessible by all of the source and destination processors for the exchange of buffer pointers.

Each buffer ring memory includes a series of locations for the storage of pointers to buffers that contain messages from the respective source that are directed to the destination processor associated with the buffer ring. The use of dedicated ring memories removes the need to synchronize source processors transferring messages to a common destination processor. As described, each source processor has a defined, dedicated memory space within its buffer ring memory for the storage of buffer pointers and, thus, can read and write to that memory space exclusive of other potential source processors. The use of a common pointer memory space for a particular destination processor that is shared by all source processors transferring messages to the particular destination processor would require atomic or interlocked bus transactions such as a read-modify-write interlocked bus transactions, to assure completion of a buffer exchange by one of the source processors. The atomic bus transactions would be needed to preclude access to the common memory space by another source processor prior to completion of the current buffer pointer exchange.

A suitable indication, such as, e.g., an "ownership" bit is arranged at each location of a buffer ring memory to mark the location as valid/not valid in respect of each of the source and destination processors linked by the particular buffer ring memory. The ownership bit is used to communicate to a processor reading the location whether the pointer stored at the location is "owned" by that processor. In general, a location owned by the source processor corresponding to the buffer ring memory contains a pointer to a free buffer that is available for transfer back to the source processor. On the other hand, a location owned by the destination processor corresponding to the buffer ring, contains a pointer to a buffer storing a message from the respective source processor that is intended for the destination processor.

A message transfer, via the transfer of a pointer to the buffer where the message is stored, can be performed in two bus transactions between any source processor and any destination processor. A source processor having a message to send to a particular destination processor will initially store the message in a free buffer in the central shared memory. During a first bus transaction, the source processor reads a next location of its buffer ring memory associated with the intended destination processor. If that location is owned by the source processor, the source processor reads the pointer stored therein for use as a free buffer in a subsequent message transfer.

The source processor, during the second bus transaction, then writes, into the location of the buffer ring memory from which it just read the pointer to the free buffer, the pointer to the buffer of the central memory where it stored the message for the particular destination processor. The source processor will also change the state of the ownership bit to indicate that the location is now owned by the respective destination processor to indicate that the location stores a pointer to a buffer containing a message for that destination. Thus, the source processor acquires a free buffer as part and parcel of the transfer of a message via independent bus transactions to access its buffer ring memory.

Each destination processor is operated to poll the locations of the local buffer ring memories for owned locations, i.e., locations containing pointers to buffers that have messages for the respective destination processor. When the destination processor locates an owned location, it reads the pointer value stored therein and then overwrites that location with a pointer to a free buffer from its pool of free buffers. Thereafter the destination processor changes the ownership bit to once again indicate that the source processor owns that location and the pointer to a free buffer stored therein. Accordingly, each destination processor must make a free buffer available for a particular source processor upon the reading of each message pointer. The destination processor can queue pointers to buffers containing messages for future access to the central buffer memory, to read the messages at the input/output bandwidth of the destination processor.

Accordingly, a free buffer is made available by a destination processor to a source processor each time a pointer to a buffer containing a message is transferred to the destination processor. Moreover, the pointer exchange is completed by independent operation of each of the source and destination processors, via the two bus transactions of the source processor to read and write to a respective dedicated ring memory and the separate polling/free pointer writing operation of the destination processor. Thus, there is no need to synchronize the processors to affect each free pointer/message pointer exchange and the exchange can be made in a bus independent operation without the need for read-modify-write or other interlocked bus transactions.

The independent operation of the source and destination processors in the buffer swapping scheme can also be used to ease latency requirements or further reduce bus bandwidth. The source processor can, for example, be operated to "read ahead" a number of locations in a buffer ring memory to acquire a preselected number of free buffers in a single bus transaction. A high performance source processor can thereby be prepared to send a burst of messages using the acquired number of free buffers. Similarly, the source processor can operate to write several message pointers into the number of locations in the buffer ring memory in a single bus transaction to further ease latencies and reduce bus bandwidth. In addition, the use of dedicated buffer ring memories at each potential destination processor, one for each potential source, enables any particular destination processor to automatically know where messages are coming from and to which source processors it is returning free buffers.

In one embodiment of the present invention, control information, in addition to the ownership bit, is provided at each buffer ring memory location. The control information comprises a "beginning/continuation/last" marker field and, in certain pointers, a "read permission" field.

The "beginning/continuation/last" marker field is used to link buffers together so that messages too large to be stored in a single fixed size buffer can be stored into several logically contiguous buffers. The marker field of a buffer storing a first portion of a long message is set to indicate a "beginning" state, with subsequent buffers for subsequent portions of the message having their respective marker fields each set to a "continuation" state until the buffer storing the last portion of the message, which has its marker field set to a "last" state. In this manner, messages of varying sizes can be transmitted between processors while maintaining a fixed size for each buffer.

The fixed size buffer feature facilitates the buffer swapping scheme according to the present invention since each free buffer that is swapped for a message buffer is advantageously stored in a buffer ring memory location prior to the writing of the message buffer, as described above. Thus, the use of a fixed size for all buffers insures that adequate buffer space is consistently returned during the buffer swapping operation. In other words, a free buffer of a size equal to any message buffer will always be swapped for a message buffer in the buffer exchange By utilizing the "beginning/continuation/last" marker field, the fixed size for the buffers can be optimized for efficient memory allocation by fixing the size to be less than the maximum possible message size, as, e.g., a size that approximates the average message size. Yet the "beginning/continuation/last" marker field provides flexibility to link buffers together so as to accommodate messages up to the maximum message size.

The "read permission" field permits a source processor to transfer a message to several destinations in one message transfer operation. The inclusion of a read permission field in a pointer communicates to each intended destination processor that the buffer ring location contains a pointer to a message, but that the buffer ring location has read only access and the buffer is still owned by the source. The source processor maintains a table storing information on destination processors to which a particular message is to be transferred. A "message read" communication is returned to the source processor by each intended destination processor upon reading the particular buffer ring location so that the source processor can progressively clear the table as "message read" communications are received. When all of the set of intended destination processors have read the message, the buffer is once again free for use with a positive indication from the now cleared table that the message has been received by all of the intended destination processors.

Thus, the present invention provides a straightforward scheme for transferring messages between processors. The scheme can be implemented in a bus independent transfer that assures a guaranteed return of free buffers to each source processor. The sizes of the buffer ring memories at each destination processor are fixed so that the polling operation of a destination processor can be optimally timed to keep pace with the transfer of messages to the destination processor. In this manner, as each source processor moves around its dedicated buffer ring memories, a next location is always owned by the source processor. As such, each source processor can also be arranged to assert a malfunction alarm when the ownership of a next buffer ring location read by the source processor is not owned by the source. Thus, the buffer swapping scheme of the present invention can be conveniently used to implement an effective alarm function so that appropriate action can be taken by a network manager to reconfigure the system as necessary to assure the free buffer swap.

DETAILED DESCRIPTION

Figure 1:
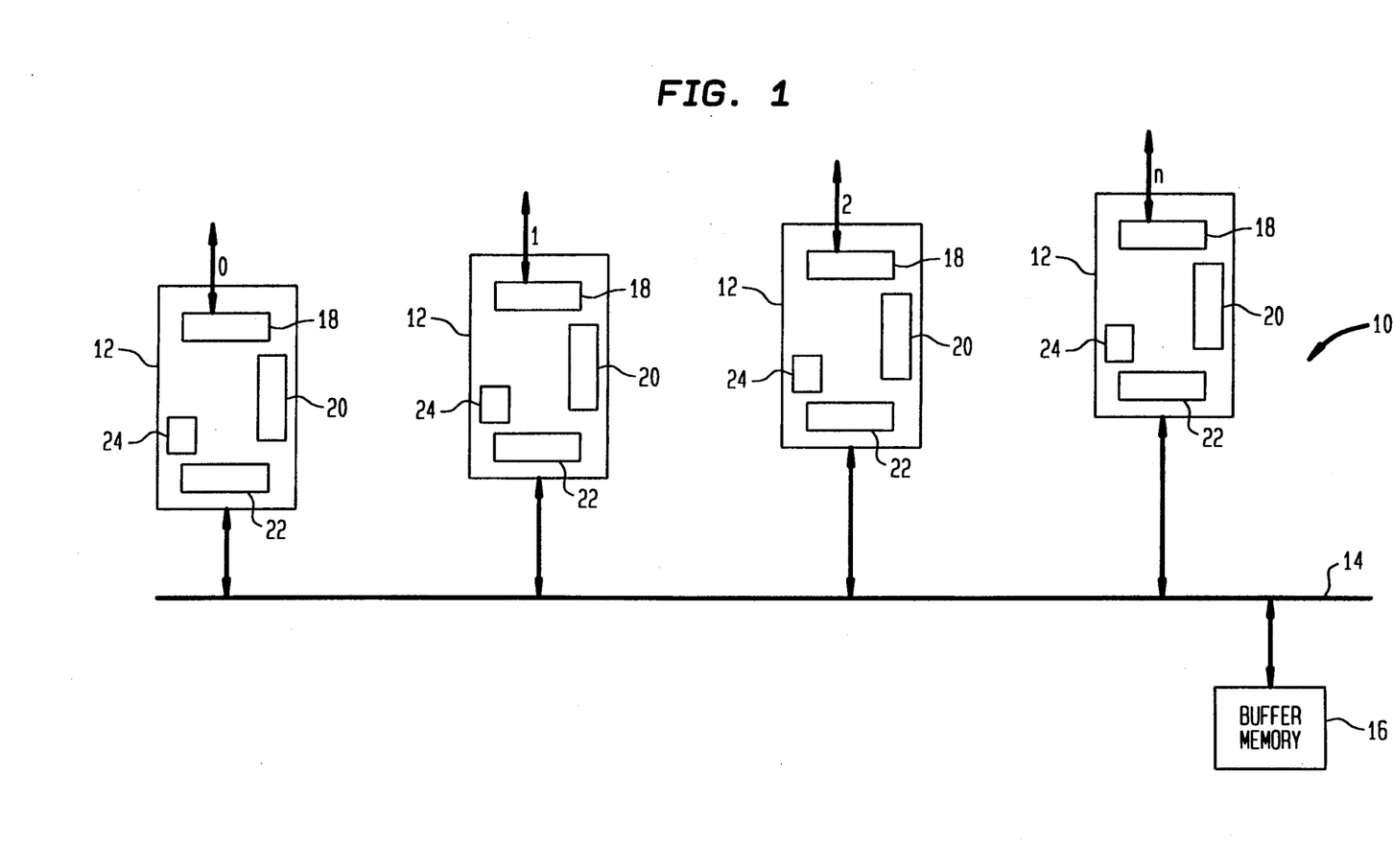
FIG. 1 is a block diagram of a representative multiprocessor computer system implementing the buffer swapping scheme of the present invention.

Referring now to the drawings, and initially to FIG. 1, there is illustrated a multiprocessor computer system generally designated by the reference numeral 10. In the illustrated system, a plurality of line cards 12 is arranged so that each line card 12 is coupled to a backplane bus 14. A central buffer memory 16 is also coupled to the bus 14 so that the line cards 12 can access the central buffer memory 16 to read and write messages that are to be communicated between the line cards 12.

There are n line cards 12, designated 0 to n, which together provide a multi-protocol router/bridge in a computer network (not illustrated). Each line card 12 comprises a line interface 18, a processor 20, a bus interface 22 and a ring memory 24.

Each line interface 18 is adapted to be coupled to a data transmission service, such as, e.g., $T_1$ or 64 K bps services provided by long distance telecommunication companies, or to a LAN to receive and transmit data packets from and to other components of the computer network. The line interfaces 18 are each configured to provide physical and data link level functionality according to a network protocol implemented on the data transmission service to which the particular line interface 18 is to be coupled.

The processor 20 of each line card 12 performs routing or bridging processing in respect of data packets received at or to be transmitted from the respective line card 12. On the receive side, each processor 20, e.g., examines the network address contained in the header of a received data packet to determine which line card 12 should be utilized to transmit the data packet for continued routing or bridging within the computer network.

Thus, each data packet is a potential "message" to a processor 20 of another line card 12, i.e., the received data packet must be transferred to the processor 20 of the transmitting line card 12 for processing and eventual transmission via the line interface 18 of the other line card 12. Accordingly, the multiprocessor computer system 10 illustrated in FIG. 1 provides an example of a high message traffic system. Each processor 20 will be primarily processing data packets that are received from other processors 20 or are to be communicated to other processors 20, to complete the transmission of data packets through the router or bridge provided by the multiprocessor computer system 10.

To that end, each processor 20 will store each received message in a free buffer in the buffer memory 16 via the respective bus interface 22 of the line card 12. The bus interface 22 operates according to a bus protocol implemented on the bus 14 to acquire control of the bus 14 and thereafter perform a write operation into the selected buffer of the buffer memory 16 via the bus 14. According to the present invention, a pointer to the buffer is then transmitted to the processor 20 of the transmitting line card 12 which utilizes the pointer to read the full data packet from the buffer memory 16 for network processing and eventual transmission.

The ring memory 24 of each line card 12 is divided into n buffer rings, one dedicated to each of the other line cards 12 of the system 10 and one dedicated to the processor 20 of the same line card 12. (In the exemplary system, a data packet received by a line card 12 that is ultimately to be transmitted by the same line card 12, is sent through the same message forwarding scheme as other data packets from the line card back to the line card.) The ring memories 24 are each used to store pointers from the other line cards 12 until the processor 20 of the line card 12 can perform a read bus transaction over the bus 14 to read the full data packet from the central memory 16.

Figure 2:
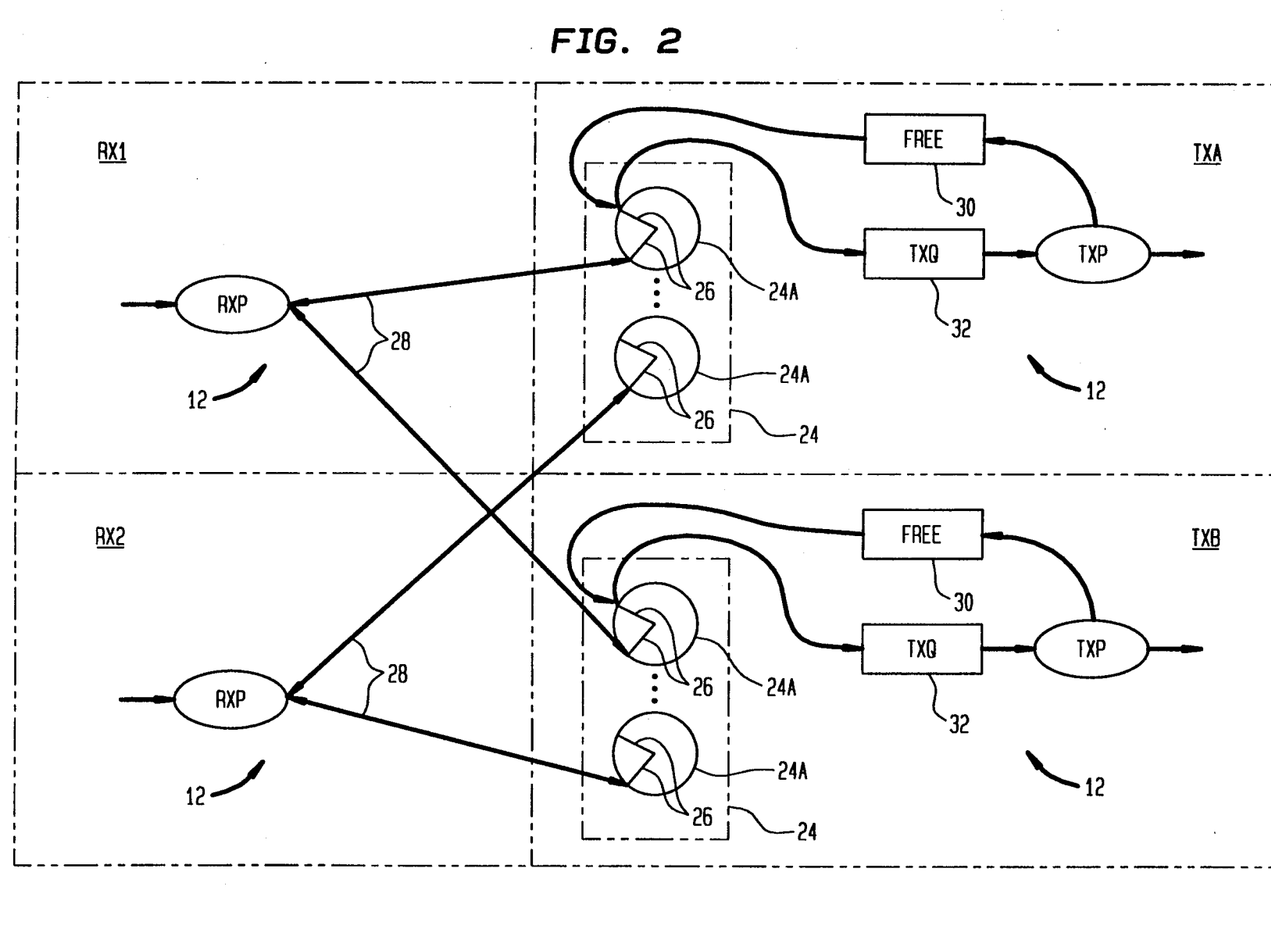
FIG. 2 is a schematic representation of the buffer swapping scheme, as implemented in the computer system of FIG. 1.

Referring now to FIG. 2, there is illustrated a schematic representation of the buffer swapping scheme according to the present invention. Each of RX1 and RX2 represents one of the line cards 12 when the respective line card is acting as a receiver of data packets and Txa and Txb each represent one of the line cards 12 when the respective line card is acting as a transmitter of data packets. RXP represents a data packet receive module provided at each processor 20 of a line card 12 to process each received data packet while TXP represents a data packet transmit module provided at each processor 20 of a line card 12 to process each data packet for transmission.

As described above, each buffer ring memory 24 is divided into n rings 24A, with each ring having a preselected number of memory locations 26 for the storage of pointers to buffers in the central memory 16. Moreover, each ring 24A is dedicated for use by one of the RXP modules, as illustrated by the lines 28. A FREE buffer queue 30 and a transmit (TXQ) buffer queue 32 is maintained by the TXP module of each line card 12.

When an RXP module needs to communicate a message (data packet) previously stored in a buffer of the central memory 16, to a particular TXP module, it will first read a location 26 of the dedicated ring 24A of the respective line card 12. Each RXP can, e.g., maintain a ring pointer for each dedicated buffer ring 24A. Each ring pointer contains an address to a location 26 of the corresponding buffer ring 24A that is to be read during a particular transaction. The RXP module will increment the address value after each transaction to continuously traverse the ring buffer 24A.

Figure 5:
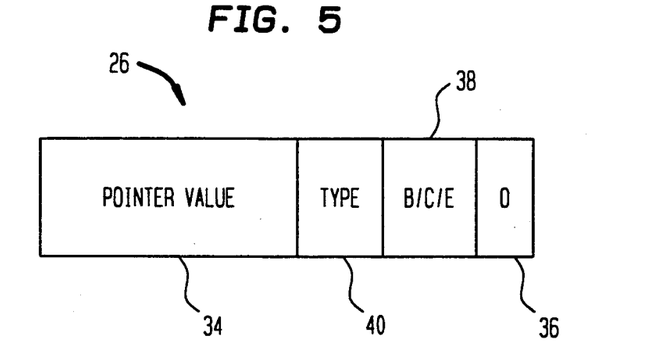
FIG. 5 is a block diagram of a pointer storage location.

Referring for a moment to FIG. 5, each location 26 includes a pointer value field 34 to store a pointer to a buffer of the central memory 16 and an ownership field 36 that comprises one bit representing either a set state or a clear state. The set state can represent ownership of the location 26 by the RXP module (the source processor) while the clear state can represent ownership of the location 26 by the TXP module (the destination processor). When the location 26 read by the RXP module is owned by that module, the pointer value 34 (See FIG. 5) is a pointer to a free buffer of the central memory 16. The RXP module will read the pointer value and store that value for use in a subsequent message transfer, as will appear.

The RXP module will then write the pointer value 34 for the buffer where the message (data packet) is stored in the central memory 16 and change the state of the ownership field 36 to indicate ownership by the TXP module of the line card 12.

Each TXP module is arranged to poll the locations 26 of the rings 24A located at the respective line card 12. When a location 26 is owned by the TXP module, the pointer value 36 stored at that location 26 is read and loaded into the TXQ queue 32. At that time, the TXP module will also write a pointer value from the FREE queue 30 into the location 26 and change the ownership bit to once again indicate that the location 26 is owned by the RXP module.

The TXP module will service each pointer loaded into the TXQ queue, as, e.g., on a FIFO basis, to access the central memory for each complete message. After the TXP module has read the complete message associated with a particular pointer value, it will transfer that pointer value to the FREE queue 30 for use in a future buffer swap operation.

Figure 3:
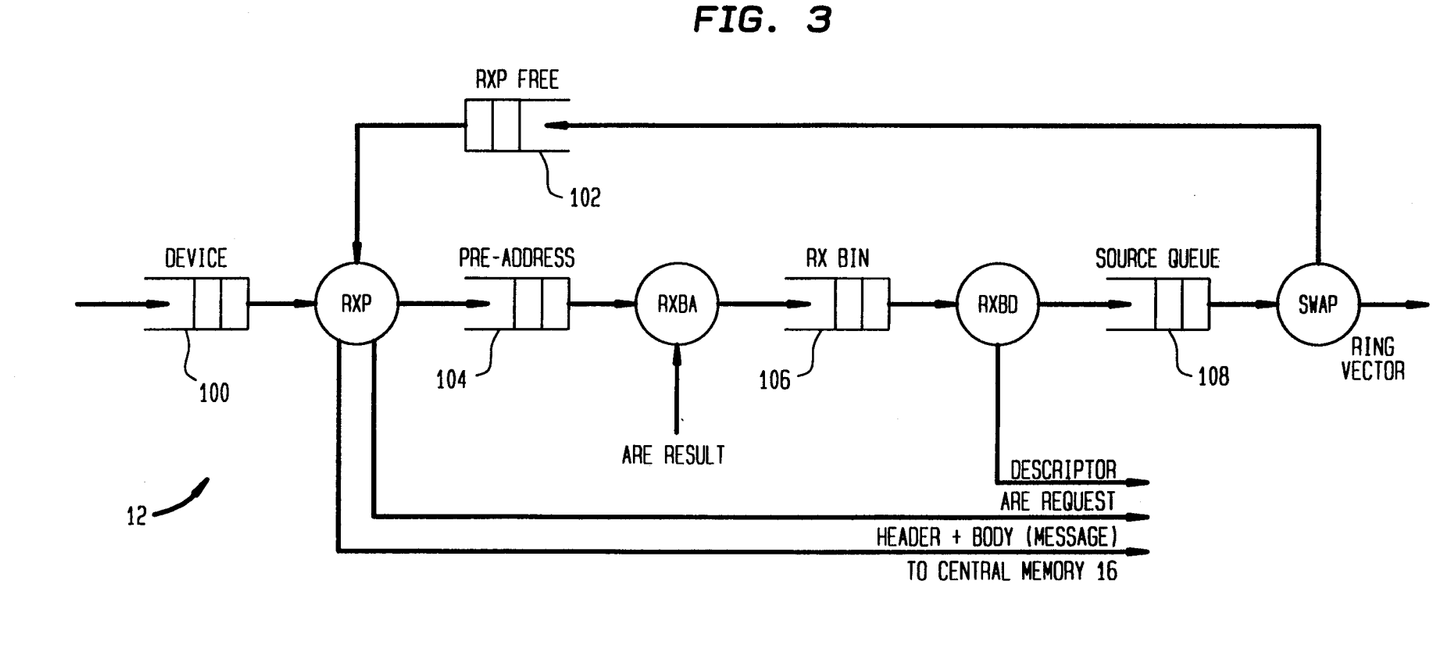
FIG. 3 is a software block diagram of a source processor performing a buffer swap in respect of a message to be transmitted to a destination processor.
Figure 4:
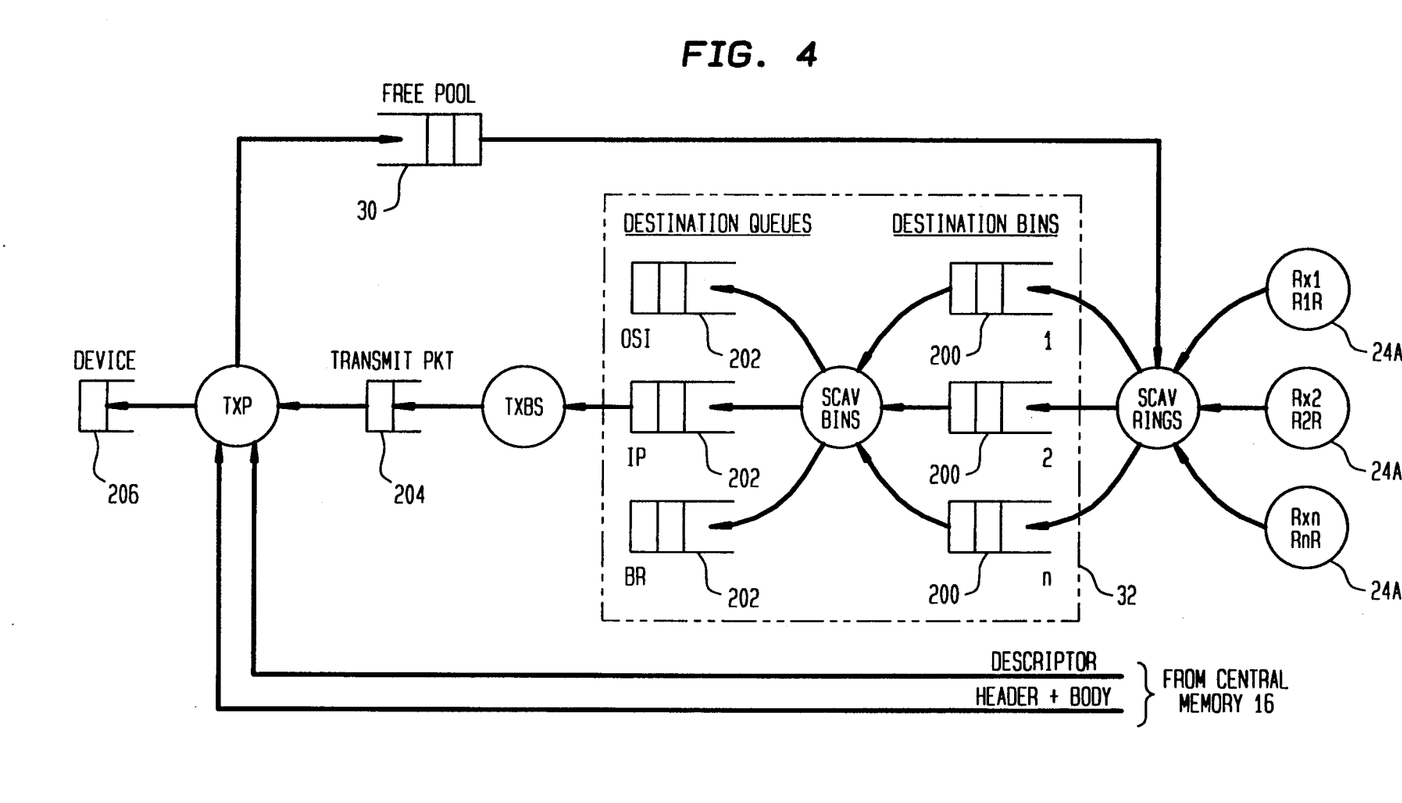
FIG. 4 is a software block diagram of a destination processor performing a buffer swap in respect of a message transacted by a source processor.

In this manner, buffers are automatically and continuously swapped between line cards 12 to facilitate message communication with a guaranteed return supply of free buffers. FIGS. 3 and 4 illustrate the above described buffer swapping scheme, in greater detail, in respect of source and destination message processing, respectively. As illustrated in FIG. 3, each complete message (data packet) is loaded into a DEVICE queue 100. The RXP module reads the messages, one at a time, from the DEVICE queue 100 and examines the header of each data packet to extract the network address, as is known in the art, for determination of which TXP module is to receive the message (data packet) for transmission.

To that end an ARE request comprising the network address, is transmitted to an address recognition engine (not illustrated) for relevant network information including the identity of the TXP module to be used to transmit the data packet. The RXP module also writes the data packet to a buffer in the central memory 16. An RXP free buffer queue 102 stores a plurality of pointers to free buffers acquired from previous buffer swaps. The RXP module will read a top free buffer pointer from the queue 102 and write the current data packet to the buffer pointed to by the pointer. The RXP free buffer queue 102 enables the RXP module to pipeline data packet processing, i.e. the RXP module can begin to process a subsequent data packet from the DEVICE queue 100 before the return of a free buffer in respect of an immediately preceding data packet(s) by storing several free buffer pointers in the RXP free queue 102.

As should be understood, the data packet is written to the central memory buffer pointed to by the pointer obtained from the RXP free buffer queue 102 via a bus transaction over the bus 14 utilizing the bus interface 22 of the respective line card 12. The RXP module then writes the pointer value into a Pre-ADDRESS queue 104.

RXBA is a sub-module of the RXP module arranged to receive the ARE result and associate the result, including the identity of the TXP module to be used to transmit the data packet, with the pointer value for the data packet central memory location. The associated pointer/TXP information is loaded by the RXBA module into an Rx BIN 106 for eventual input to an RxBD module.

The RxBD module utilizes the input information to generate a descriptor containing network information relevant to the data packet. The descriptor is also written by the RxBD module to the buffer of the central memory where the data packet itself is stored, for use by the TXP module in transmit processing. The descriptor can contain any network processing information performed by the RxP module that is also needed in the transmit processing performed by the TXP module, as described more fully in co-pending U.S. application Ser. No. 07/820,299, entitled TWO PASS MESSAGE PROCESSING, filed on even date herewith. The RxBD module passes each associated pair of pointer/TXP information to a SOURCE queue 108.

A SWAP module removes associated pairs of pointer/TXP information from the SOURCE queue 108 and performs the two bus transactions described above, over the bus 14, in respect of an owned location 26 of a corresponding ring 24A of the TXP module associated with a particular pointer in the pointer/TXP information. The free buffer obtained via the first bus transaction is loaded into the RXP free buffer queue 102 for use by the RXP module in subsequent message communications and the pointer obtained from the SOURCE queue 108 is written to the current location 26 of the corresponding ring 24A. The SWAP module also changes the ownership bit to indicate TXP ownership of the current location 26.

Referring now to FIG. 4, a ring polling module, SCAV RINGS, at each processor 20 of a line card 12, polls each location of the n rings 24A associated with the line card 12 to locate owned locations 26. The SCAV RINGS module is responsible to read the pointer of each owned location 26 and thereafter write a pointer from the FREE queue 30 into that location 26. The SCAV RINGS module will also change the ownership bit of the location 26 back to the RXP ownership state.

As illustrated in FIG. 4, the TXQ queue 32 comprises a set of destination bins 200 and a set of destination queues 202. Each destination bin 200 is dedicated to one of the rings 24A and each destination queue 202, in our representative embodiment of a multi-protocol router/bridge, is dedicated to a particular network protocol or bridging protocol, e.g., the OSI and IP network protocols and BR representing a bridging protocol. The bin/queue set arrangement is used to segregate messages, first by source and then by protocol type. This feature of the present invention provides flexibility in message handling, in respect of the source of the message and the type of message, as will appear.

Referring once again to FIG. 5, each location 26 includes a "beginning/continuation/last" marker field 38. As described above, all of the buffers of the central memory are of equal size to make certain that an equal amount of buffer space is swapped in each free buffer/message buffer exchange. The "beginning/continuation/last" marker field 38 provides a mechanism to link buffers together for communication of messages too large to be stored in a single buffer.

When an RXP module is communicating a message (data packet and associated descriptor) that is too large for a single buffer of the central memory 16, it will communicate the message in several buffers and link the buffers via the "beginning/continuation/last" marker field. The first portion of the message is placed in a first buffer and the RXP module sets the "beginning/continuation/last" marker field of the pointer to the first buffer to indicate a "beginning" buffer. Buffers containing subsequent portions of the message are each stored in the central memory 16 with the respective marker fields of the respective pointers each set to indicate "continuation" until the last portion of the message. As should be understood, the RXP module will set the marker field for the buffer pointer containing the last portion of the message to indicate "last". The beginning, continuation and last buffer pointers will be stored in contiguous locations of the appropriate buffer ring 24A associated with the destination processor.

However, to implement a fair polling operation in the SCAV RINGS modules of the processors 20, each SCAV RINGS module can be arranged, e.g., to poll a location of a particular ring 24A and move on to each other ring 24A before returning to a next location of the particular ring 24A. Thus, the SCAV RINGS module does not remove the pointers linked by their respective "beginning/continuation/last" marker fields in order. The several destination bins 200 are used to accommodate a fair polling operation and still maintain a contiguous relationship between linked buffer pointers transmitted by a particular RXP module. Each SCAV RINGS module loads each pointer read from a particular ring 24A into the bin corresponding to that ring 24A so that all beginning, continuation, last buffer pointers remain contiguous as they move through the transmitting line card 12.

A SCAV BINS module is used to transfer buffer pointers from the destination bins 200 to appropriate destination queues 202. As described above, each destination queue 202 is dedicated to a particular protocol. As illustrated in FIG. 5, each location 26 is provided with a TYPE field 40 which is used to indicate the protocol to be used for transmission of the data packet in the message pointed to by the pointer value. The RXP module inserts the protocol type in the TYPE field prior to the buffer swap operation. The SCAV BINS module examines the "beginning/continuation/last" marker field and TYPE field for each pointer removed from a particular bin 200 and loads all linked buffer pointers for a particular message into the destination queue corresponding to the protocol indicated in the TYPE field.

The various destination queues are also used to introduce fairness into the system by providing a preselected limited size queue for each protocol type. A TxBS module removes pointers from the destination queues 202 in a straight round robin polling operation so that there is progress in transmitting messages of each protocol type and no one protocol can prevent any other protocol from making progress in transmitting messages. The multiple destination queue 202 arrangement is useful because protocols have different characteristics such as different congestion algorithms. Certain congestion algorithms can block other protocols by dominating router operation if the round robin sequence through the various protocol types were not implemented.

The TxBS module loads pointers removed from the destination queues 202 to a TRANSMIT PACKET queue 204. The TXP module of the line card 12 removes pointers from the TRANSMIT PACKET queue 204, one at a time, and utilizes each pointer to access the central memory 16, via the bus 14, to read the header and body of a data packet and the associated descriptor (the message) for transmit processing. The data packet obtained from the central memory 16 is placed in a DEVICE queue 206 for eventual transmission by the line interface 18 of the line card 12. In addition, the TXP module loads the pointer just used to access a message into the FREE buffer queue 30 for use by the SCAV RINGS module in a future buffer swap, as described above.

Figure 6:
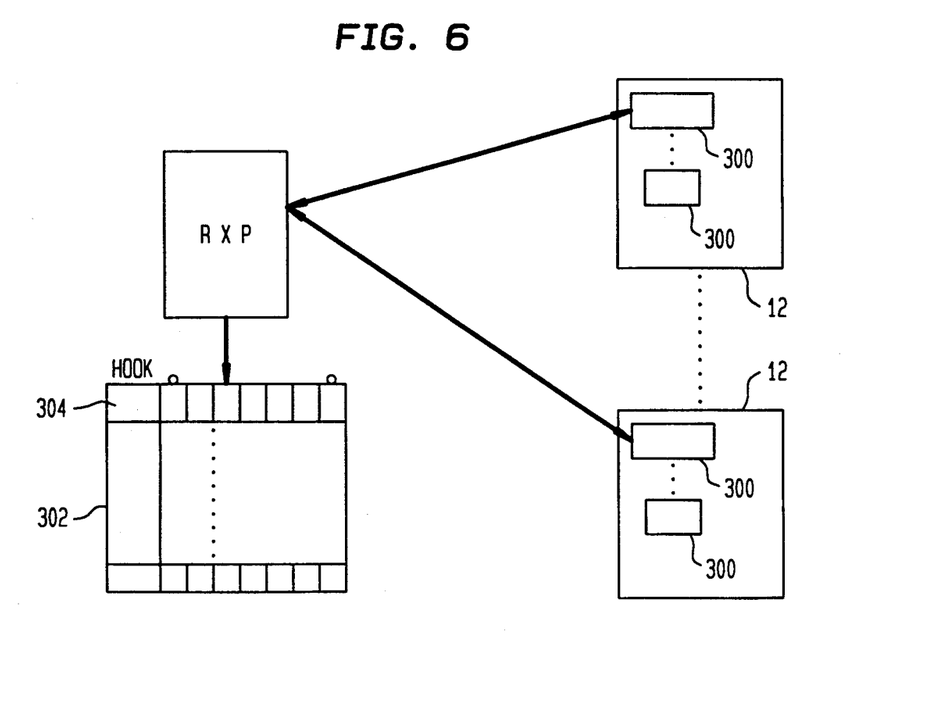
FIG. 6 is a block diagram of a mechanism for a message broadcast.
Figure 6A:
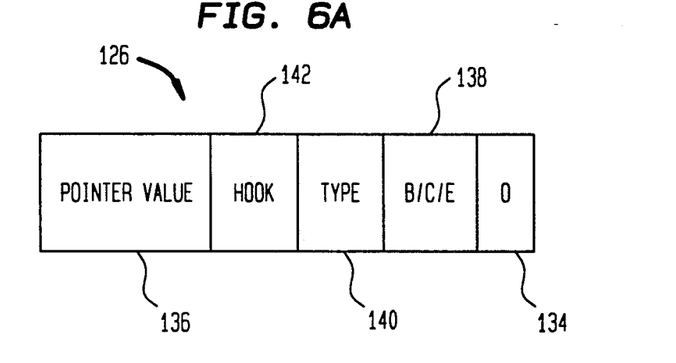
FIG. 6A is a block diagram for a pointer location used in a message broadcast.

Referring now to FIGS. 6 and 6A, there is illustrated a mechanism and buffer pointer format for broadcasting a message to several destination processors. As illustrated in FIG. 6A, a broadcast pointer 126, for use in a broadcast, is provided with an ownership field 134, pointer value field 136, "beginning/continuation/last" marker field 138 and TYPE field 140, as in the buffer pointer 26 of FIG. 5. In addition, each broadcast buffer pointer 126 is formatted to include a read permission field designated as a hook 142. An RXP module generates a hook value to identify a particular broadcast buffer pointer 126 for tracking the broadcast buffer pointer 126, as will appear.

As illustrated in FIG. 6, the RXP module broadcasting a message writes a broadcast pointer 126, containing the buffer pointer value for the buffer where the broadcast message is stored in the central memory 16 and hook value, to each destination processor that is to receive the broadcast. A special broadcast queue 300 is provided at each destination processor for each potential broadcast source. Broadcast buffer pointers 126 are written into the corresponding broadcast queues of each destination line card meant to receive the message.

The SCAV RINGS modules of the destination line cards will also poll the broadcast queues for messages. The ownership bit of each location is used as in the regular message forwarding scheme to indicate whether a pointer is to a message to be read by the SCAV RINGS module. However, the hook field 142 is interpreted by the destination SCAV RINGS modules to mean that it has read only access to the pointer location of the queue. After the SCAV RINGS module reads a broadcast queue location, it will set the ownership bit to indicate that the source once again owns the location of the broadcast queue for future use.

Each source line card maintains a table 302 of hook values including an entry 304 for each specific hook value used in a broadcast pointer 126. Each entry 304 of the table 302 contains a set of bits, one for each potential destination processor. The RXP module sets only those bits at a particular entry 304 corresponding to the destination processors to which it sent the broadcast pointer 126 having the hook value of the entry 304.

The SCAV RINGS module of each destination processor receiving a broadcast message sends the hook number to the source corresponding to the broadcast queue from where it read the broadcast message. This can be accomplished via a pointer exchange according to the present invention in the broadcast queues. For example, a SCAV RINGS module will write a pointer with a hook value from a previously read broadcast message sent by a particular source into a location of the broadcast queue corresponding to the source, after it reads the location for a current broadcast message. The SCAV RINGS module change the ownership bit to indicate that the particular source again owns the location.

Upon reading each hook value during a buffer exchange in a broadcast queue, the RXP module clears, in the entry 304 of the table 302 indicated by the hook value, the bit corresponding to the destination processor sending the hook value. When all of the bits for a hook value have been cleared, the source processor knows all of the intended destination processors have received the broadcast message and the broadcast pointer is once again free for use in another message transfer.

The buffer swapping scheme of the present invention also provides for null pointers that can be used under certain circumstances. For example, a null pointer can be returned by a destination processor when it does not have pointers to free buffers for a temporary period, yet it is desirable to continue to make progress around a buffer ring memory until free buffers become available. This would be an exception to the true buffer swap mechanism of the present invention, but provides a mechanism to handle temporary shortages of free buffer pointers at a particular destination processor. The null pointers can also be used at initialization of the system to populate the free buffer pools via an exchange of free buffer pointers for null pointers between a management processor and the operating processors of the system via the buffer ring memories or to re balance the number of buffers between the source and destination processors.

As described generally above, a SWAP module can be arranged to assert an alarm whenever a next location of a buffer ring accessed by the SWAP module is not owned by the source processor. This is a convenient way to insure that each destination processor is making progress in accessing owned location to read buffer for messages. A destination can make progress, if necessary, by returning null pointers or merely changing the ownership bit back to indicate ownership by the corresponding source (and thereby disregarding the message). Thus, whenever a location is not owned by a respective source, this is usually an indication that the destination is not operating properly to either handle messages or to make progress around buffer ring memories by permitted alternatives (i.e. returning null pointers or changing the ownership bit).

What is claimed is:

1. A computer system, which comprises:

a first computer device;

a second computer device;

a common memory comprising a plurality of buffers for storing messages to be transferred from the first computer device to the second computer device;

the first computer device and the second computer device each being coupled to the common memory;

a pointer memory coupled to each of the first computer device and the second computer device, the pointer memory having a set of locations for storing pointers to the plurality of buffers of the common memory, preselected ones of the locations each storing a pointer to a buffer of the common memory that is available for use to store a message; and a pool of pointers to the plurality of buffers of the common memory that are available for use to store messages;

the first computer device storing a pointer to at least one of the plurality of buffers and operating to transfer a message to the second computer device by writing the message to the one of the plurality of buffers, reading a preselected location of the pointer memory to obtain an available pointer to the plurality of buffers and writing the pointer to the one of the plurality of buffers to the preselected location of the pointer memory;

the second computer device operating to read the preselected location of the pointer memory to obtain the pointer to the one of the plurality of buffers storing the message and to thereafter remove a pointer to a buffer available for use from the pool of pointers and to write the removed pointer to the preselected location of the pointer memory.

2. The computer system of claim 1, wherein each location of the pointer memory includes an ownership field having a first state and a second state, the first state indicating that the corresponding location stores a pointer to a buffer that is valid for use by the first computer device to store a message to the second computer device and the second state indicating that the corresponding location stores a pointer to a buffer valid for use by the second computer device to read a message at the buffer of the common memory pointed to by the pointer.

3. The computer system of claim 2, wherein the first computer device operates to read and write pointers from and to a location only when the ownership field of the location is in the first state.

4. The computer system of claim 3, wherein the first computer device changes the state of a location from the first state to the second state after reading a pointer to a buffer available for use from the location and writing the pointer to the one of the plurality of buffers to the location of the pointer memory.

5. The computer system of claim 2, wherein the second computer device operates to read and write pointers from and to a location only when the ownership field of the location is in the second state.

6. The computer system of claim 5, wherein the second computer device changes the state of a location from the second state to the first state after reading a pointer to the one of the plurality of buffers from the location, removing a pointer to a buffer available for use from the pool of pointers and writing the removed pointer to the location.

7. The computer system of claim 1, wherein each of the buffers of the common memory are equal in memory size.

8. The computer system of claim 7, wherein each location of the pointer memory includes a "beginning-/continuation/last" marker field to link equal size buffers pointed to by pointers stored in respective locations so that a message of a size greater than the size of each buffer can be stored in buffers linked by "beginning-/continuation/last" marker fields.

9. The computer system of claim 8, wherein said "beginning/continuation/last" marker field of a first location storing a pointer to a buffer storing a first portion of a message is set to a "beginning" state and the "beginning/continuation/last" marker field of each of n locations storing pointers to buffers storing n subsequent portions of the message is set to a "continuation" state and the "beginning/continuation/last" marker field of a last location storing a pointer to a buffer storing an end portion of the message is set to a "last" state.

10. The computer system of claim 1, wherein the second computer device operates to utilize the pointer to the one of the plurality of buffers to read the message stored in the one of the plurality of buffers by the first computer device and after reading the message, to place the pointer in the pool of pointers.

11. A mechanism for transferring a message from a first computer device to a second computer device, comprising:
a common memory comprising a plurality of buffers for storing messages from the first computer device to the second computer device;
a pointer exchange mechanism for exchanging pointers to the buffers of the common memory between the first and second computer devices; and
a pool of pointers to buffers of the common memory that are available for use to store messages;
the pool of pointers being coupled to the pointer exchange mechanism;
the pointer exchange mechanism being adapted to interlock the first and second computer devices to accept a pointer to a buffer containing a message, from the first computer device, on a first condition that a pointer from the pool of pointers is read by the first computer device, and to make the pointer accepted from the first computer device available to the second computer device on a second condition that the second computer device places the pointer in the pool of pointers after utilizing the pointer to read the message in the buffer.

12. The mechanism of claim 11, wherein the pointer exchange mechanism includes a pointer memory having locations for storing pointers to the buffers of the common memory, certain ones of the locations storing pointers to buffers that are available for use to store messages obtained from the pool of pointers, the first condition of the pointer exchange mechanism requiring the first computer device to read one of the certain ones of the locations to obtain the pointer stored therein and to thereafter write the pointers to the buffer containing the message for the second computer device.

13. The mechanism of claim 12, wherein the pointer exchange mechanism includes a third condition that requires the second computer device to write a pointer from the pool of pointers into a location of the pointer memory after the second computer device reads a pointer from the location.

14. The mechanism of claim 13, wherein each location of the pointer memory includes an ownership field having a first state and a second state, the first state indicating that the corresponding location stores a pointer to a buffer that is valid for use by the first computer device to store a message to the second computer device and the second state indicating that the corresponding location stores a pointer to a buffer valid for use by the second computer device to read a message at the buffer of the common memory pointed to by the pointer.

15. The mechanism of claim 14, wherein the pointer exchange mechanism includes a fourth condition such that:
i) the first computer device operates to read and write pointers from and to a location only when the ownership field of the locations is in the first state, and
ii) the first computer device changes the state of the location from the first state to the second state after reading a pointer to a buffer available for use from the location and writing the pointer to the one of the plurality of buffers to the preselected location of the pointer memory.

16. The mechanism of claim 15, wherein the pointer exchange mechanism includes a fifth condition such that:
i) the second computer device operates to read and write pointers from and to a location only when the ownership field of the location is in the second state, and
ii) the second computer device changes the state of the location from the second state to the first state after reading a pointer to the one of the plurality of buffers from the location, removing a pointer to a buffer available for use from the pool of pointers and writing the removed pointer to the location.

17. A first computer device adapted for coupling to a second computer device to receive messages from the second computer device, the coupling including a common memory having a plurality of buffers for storing messages from the second computer device to the first computer device and a pointer memory having a set of locations for storing pointers to buffers of the common memory, preselected ones of the locations each storing a pointer to a buffer of the common memory that is available for use to store a message, the first computer device comprising:
a first module to read a preselected location of the pointer memory for a pointer to a buffer of the common memory storing a message from the second computer device;
a pool of pointers to buffers of the common memory that are available for use to store messages; and
a second module to write a pointer to a buffer from the pool of pointers to the preselected location after reading the pointer in the location.

18. A mechanism for transferring a message from a first computer device to preselected ones of a plurality of other computer devices, which comprises:
a common memory comprising a plurality of buffers for storing messages from the first computer device;
a pointer exchange mechanism for exchanging pointers to the buffers of the common memory between the first computer device and the preselected ones of the other computer devices, each pointer pointing to one buffer of the common memory and containing a unique identification identifying one of the preselected ones of other computer devices; and a table having a set of entries, one entry for each unique identification, each entry having a flag set for each one of the preselected ones of the other computer devices to receive the message;

the pointer exchange mechanism being adapted to interlock the first computer device and the other computer devices to accept from the first computer device, a pointer to a buffer containing a message, for communicating the pointer to each one of the preselected ones of the other computer devices to receive the message, on condition that the unique identification for the pointer be returned to the first computer device by each one of the preselected ones of the other computer devices upon accessing the buffer pointed to by the pointer;

the first computer device operating to clear the flag in the entry of the table for the unique identification, for each one of the preselected ones of the other computer devices as the unique identification is returned by each one of the preselected ones of the other computer devices, until all of the flags of the entry are cleared.

19. A first computer device adapted for coupling to a plurality of other computer devices for transferring messages from the first computer device to preselected ones of the other computer devices, the coupling including a common memory comprising a plurality of buffers for storing messages from the first computer device, the first computer device comprising:

a first module to write a message intended for preselected ones of the other computer devices into a preselected one of the buffer; and a second module to pass a pointer to the preselected one of the buffers to each of the preselected ones of the other computer devices, the second module marking the pointers with a hook value;

the second module maintaining a table of hook values with an entry for the hook value of the pointer, the entry comprising a mask to identify each of the preselected ones of the other computer devices;

the second module adapted for coupling to a pointer exchange mechanism adapted to interlock the first computer device and the other computer devices to accept from the second module, the pointer to the preselected one of the buffers, for communicating the pointer to each one of the preselected ones of the other computer devices to receive the message, on condition that the unique identification for the pointer be returned to the second module by each one of the preselected ones of the other computer devices upon accessing the buffer pointed to by the pointer;

the second module operating to clear the flag in the entry of the table for the unique identification, for each one of the preselected ones of the other computer devices as the unique identification is returned by each one of the preselected ones of the other computer devices via the pointer exchange mechanism, until all of the flags of the entry are cleared.

20. A first computer device adapted for coupling to a second computer device to receive a message from the second computer device, the coupling including a common memory comprising a plurality of buffers for storing messages from the second computer device, the second computer device adapted to send to the first computer device pointers to buffers containing messages for the first computer device, each pointer containing a unique hook value for uniquely identifying the first computer device, the first computer device comprising:

a first module to receive a pointer from the second computer device on condition that the first module return the hook value of the received pointer to the second computer device.

21. A first computer device adapted for coupling to a second computer device for the transfer of messages from the first computer device to the second computer device, the coupling including a common memory having a plurality of buffers for storing messages and a pool of pointers to buffers available for use to store messages, the pool of pointers being maintained by the second computer device, the first computer device comprising:

a first module to write a message intended for the second computer device into a preselected one of the buffers of the common memory; and a second module to pass a pointer to the preselected one of the buffers to the second computer device on condition that the second module acquire a pointer from the pool of pointers via the second computer device when passing the pointer to the preselected one of the buffers.

22. A first computer device adapted for coupling to a second computer device to receive messages from the second computer device, the coupling including a common memory having a plurality of buffers for storing messages from the second computer device and a pool of pointers to buffers available for use to store messages, the second computer device adapted to send to the first computer device, pointers to buffers of the common memory containing messages for the first computer device, the first computer device comprising:

a first module to receive a pointer from the second computer device on condition that the first module return a pointer to the second computer device from the pool of pointers.

23. The first computer device of claim 22, wherein the first module utilizes the pointer received from the second computer device to access the common memory and thereafter returns the pointer received from the second computer device to the pool of pointers.

24. A method for transferring a message from a first computer device to a second computer device, comprising the steps of:

providing a common memory comprising a plurality of buffers for storing messages from the first computer device to the second computer device;

providing a pool of pointers to buffers of the common memory available for use to store messages;

operating the first computer device to store a message in a preselected buffer of the common memory;

operating the first computer device to pass a pointer to the preselected buffer to the second computer device; and operating the second computer device to utilize the pointer to the preselected buffer to access the preselected buffer for the message stored therein; and operating the second computer device to place the pointer in the pool of pointers upon accessing the preselected buffer.

25. A method for transferring a message from a first computer device to a second computer device, comprising the steps of:

providing a common memory comprising a plurality of buffers for storing messages from the first computer device to the second computer device;

providing a pool of pointers to buffers of the common memory available for use to store messages;

operating the first computer device to store a message in a preselected buffer of the common memory;

operating the first computer device to pass a pointer to the preselected buffer to the second computer device; and operating the second computer device to utilize the pointer to the preselected buffer to access the preselected buffer for the message stored therein and to affect a transfer of a pointer from the pool of pointers to the first computer device a condition for utilizing the pointer to the preselected buffer.

26. The method of claim 25 comprising the further steps of:

providing a pointer memory having locations for storing pointers to buffers of the common memory, certain ones of the locations each storing a pointer to a buffer available for use to store a message; and performing the step of operating the first computer device to pass a pointer by operating the first computer device to write the pointer into the one of the certain ones of the locations after reading that location for a pointer to a buffer available for use to store a message.

27. The method of claim 26 comprising the further step of:

operating the second computer device to read the one of the certain ones of the locations for the pointer to the preselected buffer and to write a pointer from the pool of pointers into that location upon and as a condition for reading the pointer to the preselected buffer.

* * * * *